(12) United States Patent
Manullang et al.

(10) Patent No.: US 8,859,920 B2
(45) Date of Patent: Oct. 14, 2014

(54) SHIM SLEEVE FOR PIVOTING BUTTONS

(75) Inventors: Tyson Manullang, Sunnyvale, CA (US); Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 13/280,747

(22) Filed: Oct. 25, 2011

(65) Prior Publication Data

US 2013/0098191 A1    Apr. 25, 2013

(51) Int. Cl.
| H01H 3/00 | (2006.01) |
| G06F 3/023 | (2006.01) |
| H05K 5/00 | (2006.01) |
| H01H 13/705 | (2006.01) |
| G05G 1/04 | (2006.01) |

(52) U.S. Cl.
CPC ........ G06F 3/0234 (2013.01); *H01H 2221/016* (2013.01); H01H 13/705 (2013.01); *H01H 2223/04* (2013.01); H05K 5/0017 (2013.01); *G05G 1/04* (2013.01)
USPC ....................................................... 200/339

(58) Field of Classification Search
USPC ....................... 200/339, 349, 6 A, 557, 277.2
See application file for complete search history.

(56) References Cited

U.S. PATENT DOCUMENTS

| 1,608,108 | A | 11/1926 | Martus et al. |
| 2,473,848 | A | 8/1947 | Baxter |
| 2,821,589 | A | 1/1958 | Needham |
| 3,123,792 | A | 3/1964 | Klemm |
| 3,471,663 | A | 10/1969 | Farrell |
| 4,227,059 | A | 10/1980 | Ogawa |
| 4,340,791 | A * | 7/1982 | Sorenson .................... 200/302.3 |
| 5,180,051 | A | 1/1993 | Cook et al. |
| 5,496,977 | A * | 3/1996 | Date et al. ..................... 200/6 A |
| 5,936,213 | A | 8/1999 | Biquez et al. |
| 6,040,543 | A * | 3/2000 | Mina et al. .................... 200/339 |
| 6,201,196 | B1 * | 3/2001 | Wergen .......................... 200/6 A |
| 6,591,457 | B1 | 7/2003 | Howie, Jr. |
| 6,630,635 | B1 * | 10/2003 | Doepner ....................... 200/6 A |
| 6,667,450 | B2 * | 12/2003 | Bulin et al. ................ 200/302.3 |
| 6,707,358 | B1 | 3/2004 | Massman |
| 6,762,381 | B2 | 7/2004 | Kunthady et al. |
| 7,101,603 | B2 | 9/2006 | Okamura et al. |
| 7,297,221 | B2 | 11/2007 | Hikita |
| 7,531,765 | B2 | 5/2009 | Komagata |
| 7,727,618 | B2 | 6/2010 | Iwano |
| 2013/0084430 | A1 | 4/2013 | Hill et al. |
| 2013/0112536 | A1 | 5/2013 | Shah et al. |

FOREIGN PATENT DOCUMENTS

| EP | 0424173 | 4/1991 |
| GB | 581824 | 10/1946 |
| GB | 957644 | 5/1964 |

* cited by examiner

*Primary Examiner* — Felix O Figueroa
(74) *Attorney, Agent, or Firm* — Brownstein Hyatt Farber Schreck, LLP

(57) ABSTRACT

A button assembly having a shim for a pivot button. One embodiment may take the form of a button assembly with a stem and a receiving portion pivotally coupled to the stem. The stem is positioned within an aperture of the receiving portion, with the aperture providing a gap between the receiving portion and the stem. A shim sleeve having non-uniform thickness is coupled over the stem and positioned between the receiving portion and the stem. The shim sleeve is configured to reduce the gap between the receiving portion and the stem.

18 Claims, 16 Drawing Sheets

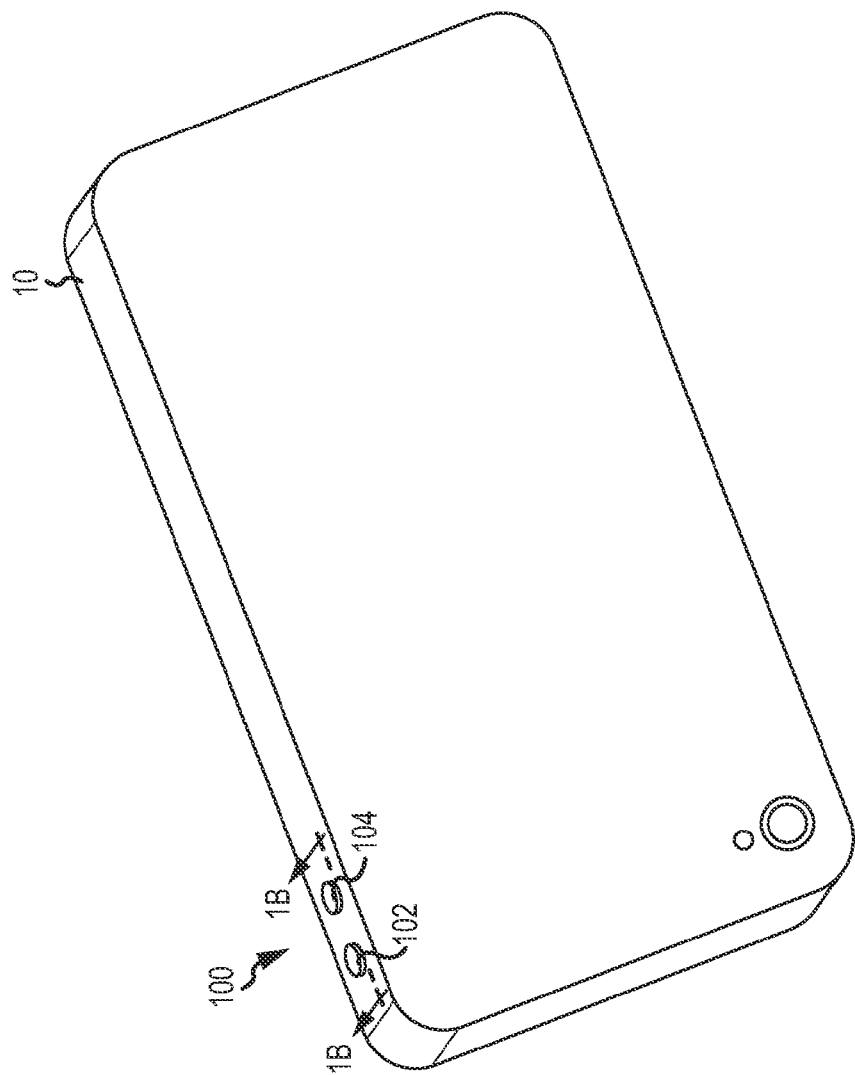

SHIM SLEEVE FOR PIVOTING BUTTONS

TECHNICAL FIELD

The present application generally relates to mechanical button assemblies and, more particularly, to a shim sleeve for pivot button assemblies.

BACKGROUND

The operation of a conventional push-type mechanical button generally entails a linear displacement of the button by force. The displacement of the button may actuate one or more sensors (e.g., a switch), which may in turn cause an electrical signal to be transmitted. Specifically, the linear motion of the force on the button is transferred linearly to a sensor. For example, when an "up" volume button is pushed on an electronic device such as a cell phone or a music player, the button may actuate a sensor that in turn transmits a signal to the device's processor in order to increase the volume for the device.

Pivot-type mechanical buttons are different from push-type mechanical buttons in that pivot-type mechanical buttons typically have a body that pivots about an axis, with one or more buttons coupled to the pivoting body. A force applied to a button of a pivot-type button's body, for example, may create a torque about the pivot point of the pivot body, which displaces the button to actuate a sensor, as opposed to transferring linear force to a sensor in push-type mechanical buttons.

SUMMARY

Embodiments may take the form of shim sleeves for pivot buttons. For example, embodiment may take the form of a button assembly having a stem and a receiving portion pivotally coupled to the stem. The stem is positioned within an aperture of the body, with the aperture of the receiving portion providing a gap between the receiving portion and the stem. A shim sleeve having a non-uniform thickness is coupled over the stem and positioned between the receiving portion and the stem. The shim sleeve is configured to reduce the gap between the receiving portion and the stem.

Another embodiment may take the form of an apparatus with a base and a button movably coupled to the base through a shaft and a shaft receiving portion. The shaft receiving portion defines an arcuate structure configured to receive at least a portion of the shaft. A shim is coupled between the shaft and the shaft receiving portion and has first and second surfaces. The first surface of the shim is configured to engage the portion of the shaft. The second surface of the shim is configured to engage at least a portion of the arcuate structure of the shaft receiving portion.

In yet another embodiment, a method of manufacture may include positioning a pivoting body within a housing, with the pivoting body pivotally coupled to the housing through a shaft and a shaft receiving portion. The shaft receiving portion defines an arcuate structure configured to receive at least a portion of the shaft. After the pivoting body is positioned within the housing, a shimming sleeve is positioned between the shaft and the arcuate structure. The sleeve is configured to reduce a gap between the shaft and the shaft receiving portion.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

BRIEF DESCRIPTION OF THE DRAWINGS

FIG. 1A illustrates a device with an embodiment of a pivoting button assembly.

DETAILED DESCRIPTION

Figure 1B:
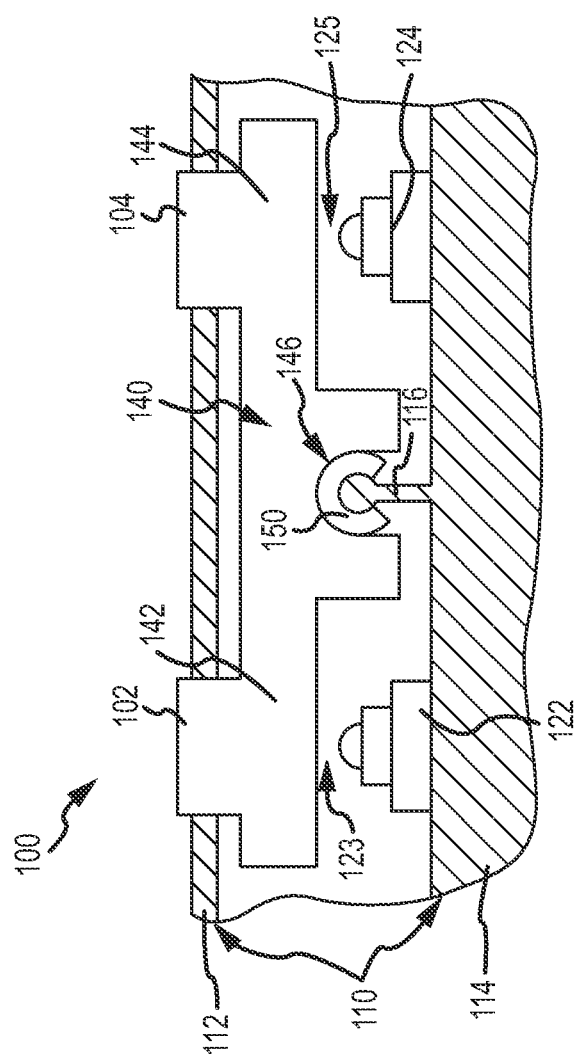
FIG. 1B is a partial cross-sectional view of the pivoting button assembly of FIG. 1A taken along line 1B-1B in FIG. 1A.

A shim sleeve is disclosed for use in a pivoting button assembly. In some embodiments, the shim sleeve is coupled between a receiving portion and a shaft in order to provide a better fit between the receiving portion and the shaft. The shim sleeve may be extruded, and may generally have an outer cross section of any of a number of different shapes including a circle, oval, square, triangle, and so forth. Also, an inner portion of the shim sleeve may be hollow in order to fit over the shaft. The outer cross section and the shape of the inner portion of the shim sleeve may generally correspond to the shape of the receiving portion and the shaft, respectively.

The shim sleeve may take up manufacturing and assembly tolerances and preload the pivoting button. The shim sleeve may also allow for convenient assembly of a device incorporating a shimmed pivoting button—for example towards the end of the manufacturing process. The button assembly that receives the shim sleeve may also be configured to allow the shim sleeve to be easily removed and/or replaced during prototyping or normal operation of the device in some embodiments.

Referring now to FIG. 1A, a device 10 with a pivoting button assembly 100 is illustrated. The pivoting button assembly 100 may include a plurality of buttons. For example, two buttons 102, 104 are illustrated in FIG. 1A which allow for user input to the device 10 and may correspond to particular functions of the device. For example, the buttons 102, 104 may provide volume control, up and down scrolling, zoom functionality, and so forth. The device 10 in FIG. 1A may be a cell phone, smart phone, media player or the like. In other embodiments, however, the device 10 may be a camera, a remote control for a television or other content device, a game controller with a four-way direction pad, a game controller with a multi-directional joystick, or any type of device with one or more pivoted buttons or other control elements. The two buttons 102, 104 illustrated in FIG. 1A may have opposite functions, for example volume up and volume down, or zoom in and zoom out. As such, the button assembly 100 may be a pivoting-type button assembly with a two-way pivoting body coupling the two buttons 102, 104 in a seesaw-like manner, with the pivot point being below the approximate middle of the two buttons 102, 104.

As a result of the pivot point being below the approximate middle of the two buttons, 102, 104, when the first button 102 is depressed, the pivoting button assembly 100 may rotate about the pivot point such that the portion of the two-way pivoting body coupled to the first button 102 is sloped down towards the direction of force on the first button 102 and the portion of the two-way pivoting body coupled to the second button 104 is consequently sloped up in the opposite direction of force on the first button 102. Similarly, when the second button 104 is depressed, the pivoting button assembly 100 may rotate about the pivot point such that the portion of the two-way pivoting body coupled to the second button 104 is sloped down towards the direction of force on the second button 104 and the portion of the two-way pivoting body coupled to the first button 102 is consequently sloped up in the opposite direction of force on the second button 104. This pivoting action between the two buttons 102, 104 may prevent a user from depressing both buttons 102, 104 at the same time. Further, the pivoting action may provide tactile feedback for a user depressing one of the two buttons 102, 104.

A partial cross-sectional view of the button assembly 100 of FIG. 1A taken along line 1B-1B of the device 10 is illustrated in FIG. 1B. As illustrated, a two-way pivoting body 140 is positioned with the housing 110 of the device. The housing 110 may include an upper cover 112 and a (lower) base 114. The upper cover 112 and the base 114 may generally be made from any suitable material including metal, plastic, wood, glass, and so forth. In one embodiment, the upper cover 112 and the base 114 may both be made of aluminum. As illustrated in FIG. 1B, the base 114 may also include a stem 116, a portion of which may be the pivot point for the pivoting button assembly 100. The stem 116 may extend perpendicularly from the base 114 and may include a relatively narrow shaft and a generally round top. The stem 116 may be fixed with respect to the base 114 by, for example welding the stem 116 to the base 114. In other embodiments, the stem is integrally a part of the base 114 in that the stem 116 may have been molded or formed with the base 114.

One or more sensors 122, 124 (such as switching elements) may be coupled to the base 114. The two sensors 122, 124 illustrated in FIG. 1B may correspond, for example, to a pair of volume control buttons, with a first sensor 122 corresponding with an "up" volume control and a second sensor 124 corresponding with a "down" volume control. The sensors may send respective electrical signals to a processor in response to the sensors being actuated by a mechanical force.

The two-way pivoting body 140 illustrated in FIG. 1B is positioned within the housing 110 of the device 10, and coupled to the base 114 via the stem 116. The two-way pivoting body 140 may include and/or be coupled to the two buttons 102, 104. As illustrated in FIG. 1B, the two buttons 102, 104 may integrally be part of the two-way pivoting body 140, although in other embodiments the two buttons 102, 104 may be distinct from the two-way pivoting body 140 but glued, welded, or otherwise coupled to the two-way pivoting body 140. The two-way pivoting body 140 may include a first portion 142 configured to engage the first sensor 122 and a second portion 144 configured to engage the second sensor 124.

The two-way pivoting body 140 illustrated in FIG. 1A also includes an aperture such as a shaft receiving portion 146 near the middle of the two-way pivoting body 140 that is configured to be coupled with the stem 116. The shaft receiving portion 146 may have two generally parallel sidewalls and an arcuate upper portion between the two generally parallel sidewalls. The shaft receiving portion 146 may generally be longer and wider than the stem 116, but may not have as great of height as the stem 116 in some embodiments. The shaft receiving portion, however, may have a greater height than the generally round top of the stem 116 as illustrated in FIG. 1B. As such, when the two-way pivoting body 140 is positioned within the housing 110, an assembly gap may exist between the two-way pivoting body 140 and the stem 116 of the housing 110. This assembly gap may allow for the two-way pivoting body 140 to be positioned within the housing 110 during manufacturing, but may be undesirable during operation of the two buttons 102, 104 because it may allow too much movement of the two-way pivoting body 140 (and therefore too much movement of the two buttons 102, 104) during operation. The two-way pivoting body 140 may include one or more access openings in order to allow a shim sleeve 150 to be inserted into the pivoting button assembly 100 during manufacturing, as described below in connection with FIG. 6. In other embodiments, however, the two-way pivoting body 140 may not include any access openings.

A shim sleeve 150 may be coupled between the shaft receiving portion 146 of the two-way pivoting body 140 and the stem 116, as shown in FIG. 1B. The shim sleeve may reduce the assembly gap between the two-way pivoting body 140 and the stem 116. The shim sleeve may also reduce undesirable movement of the two-way pivoting body 140 within the housing, and may prevent the two-way pivoting body 140 and the stem 116 from wearing due to such movement. The shim sleeve 150 may also preload the two-way pivoting body 140 in order to adjust the ease with which the two-way pivoting body 140 can pivot around the stem 116. In some embodiments, the shim sleeve 150 may pivot with the body 140 as the body pivots about the stem 116. In other embodiments, however, the shim sleeve 150 may not pivot with the body 140, but rather may stay substantially fixed on the stem 116.

When a shim sleeve 150 is coupled between the two-way pivoting body 140 and the stem 116 (as described below), a gap 123 may be present between the first portion 142 of the two-way pivoting body 140 and the first sensor 122. Similarly, a gap 125 may be present between the second portion 144 of the two-way pivoting body 140 and the second sensor 124. The gaps 123, 125 may allow some movement of the buttons 102, 104 and/or the two-way pivoting body 140 before the sensors 122, 124 are actuated, which may prevent the sensors 122, 124 from being accidentally actuated, such as when a slight force is applied to the buttons 102, 104. The gaps 123, 125 may also create or enhance a "click" noise and/or feel when a force is applied to the buttons 102, 104.

Figure 1C:
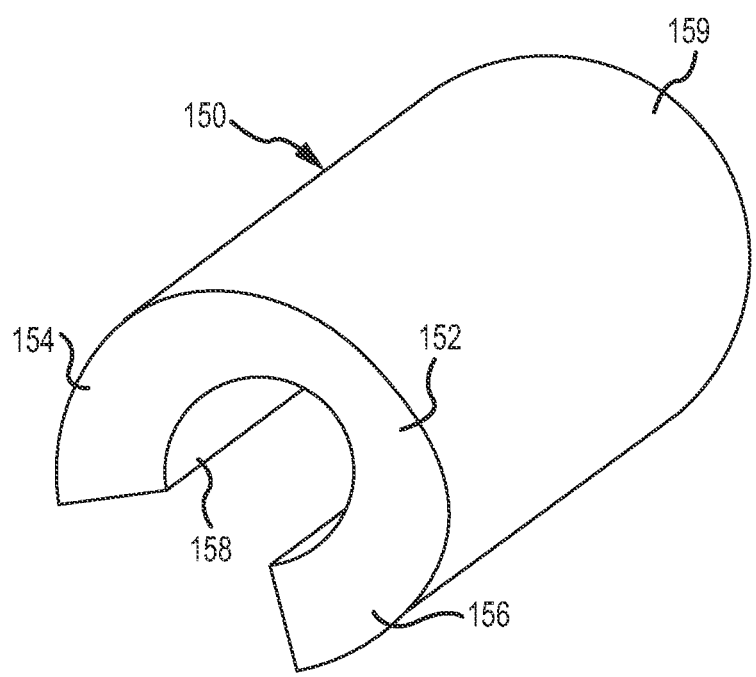
FIG. 1C is a perspective view of an embodiment of a shim sleeve for a pivoting button assembly.
Figure 1D:
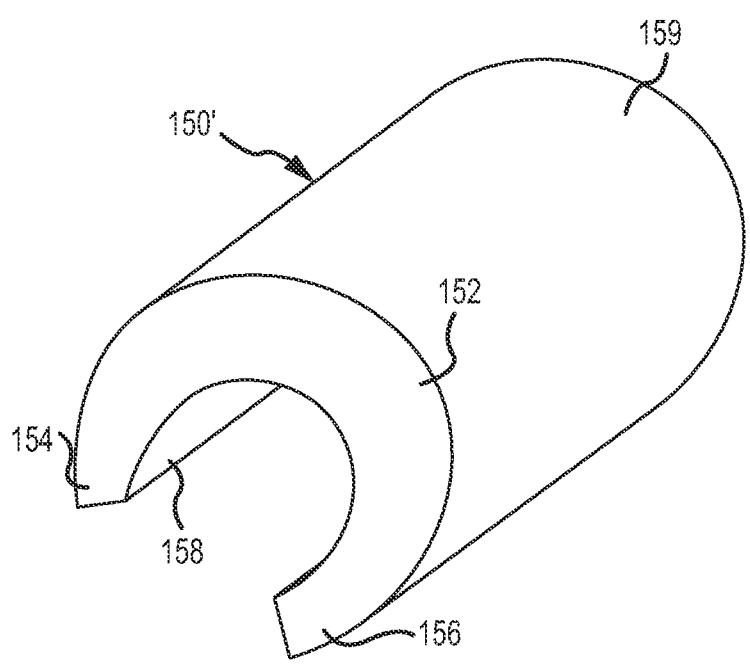
FIG. 1D is a perspective view of an embodiment of a shim sleeve for a pivoting button assembly.

A perspective view of an embodiment of a shim sleeve 150 is illustrated in FIG. 1C and a perspective view of another embodiment of a shim sleeve 150' is illustrated in 1D. The shim sleeve 150 illustrated in FIG. 1C is generally shaped like a cylinder with a portion of the sidewall of the cylinder cut-away. For example, between 15 and 35 percent of the sidewall may be cut-away in some embodiments, while other embodiments may include a larger or smaller cut-away portion. In other words, the shim sleeve 150 illustrated in FIG. 1C is generally shaped like a split bushing with the split or cut in the bushing extending between approximately 60 and 120 degrees along the sidewall of the split bushing. The shim sleeve 150 may include a top portion 152, a left side portion 154, and a right side portion 156. As illustrated in FIGS. 1C and 1D, the shim sleeve 150, 150' may be eccentrically shaped in some embodiments. For example, the left and right side portions 154, 156 may be thicker than the top portion 152 of the shim sleeve 150, as shown in FIG. 1C.

In FIG. 1D, however, the top portion 152 is generally thicker than the left and right side portions 154, 156. In other embodiments, the left side portion 152 and/or the right side portion 154 may be thicker than each other and/or than the top portion 152; in general, the top, left, and right side portions 152, 154, 156 of the sidewall of the shim sleeve 150 may be of any thickness. The top, left, and right side portions 152, 154, 156 may also in some embodiments have a substantially uniform thickness, thereby creating a cylinder with a substantially uniform radius. The thickness of the top, left, and right side portions 152, 154, 156 may in some embodiments depend on the assembly gap between the two-way pivoting body 140 and the stem 116. As the shim sleeve 150 may be installed after the assembly of the button assembly, the dimensions of the shim sleeve may be customized to achieve a desired fit.

Returning to the shim sleeve 150 illustrated in FIG. 1C, the shim sleeve may include an inner surface 158 and an outer surface 159. The inner surface 158 may be shaped and configured to engage at least a portion of the stem 116, and the outer surface 159 may be shaped and configured to engage at least a portion of the aperture or shaft receiving portion 146 of the two-way pivoting body 140. Furthermore, the inner surface 158 may at least partially enclose a recess. As described above, in the two-way pivoting body 140 illustrated in FIG. 1B, the shaft receiving portion 146 includes two generally parallel sidewalls and an arcuate upper portion. Accordingly, the outer surface 159 of the shim sleeve 150 may be generally cylindrical as illustrated in FIGS. 1C and 1D. Furthermore, the stem 116 illustrated in FIG. 1B includes a shaft and a generally round top, and accordingly, the inner surface 158 of the shim sleeve 150 may be generally cylindrical as also illustrated in FIGS. 1C and 1D. The generally cylindrical or arcuate inner and outer surfaces 158, 159 may be extruded along the length of the shim sleeve, thereby forming a generally cylindrical shape. In general, the stem 116 and the shaft receiving portion 146 may take any form, in which case the first and second surfaces 158, 159 of the shim sleeve 150 may be properly adjusted to engage at least a portion of the stem 116 and at least a portion of the shaft receiving portion 146, respectively. The shim sleeve 150 may be adjusted, for example, to adjust the vertical position of the receiving portion 146 with respect to the stem 116.

Returning to FIG. 1D the shim sleeve 150' illustrated there includes an inner surface 158 that is somewhat similar to the inner surface 158 of the shim sleeve 150 illustrated in FIG. 1C because, for example, the stem 116 to which the shim sleeves 150, 150' in FIGS. 1C and 1D may be coupled may be somewhat similar. The shim sleeve 150' in FIG. 1D, however, includes a modified second surface 159 as compared with the shim sleeve 150 in FIG. 1C. The second surface 159 of the shim sleeve 150' in FIG. 1D may have been modified because, for example, the shaft receiving portion of the two-way pivoting body to which the shim sleeve 150' in FIG. 1D is to be coupled is different than the shaft receiving portion to which the shim sleeve 150 is to be coupled. For example, the shaft receiving portion of the two-way pivoting body to which the shim sleeve 150' in FIG. 1D is to be coupled may include two generally parallel sidewalls and an arcuate upper portion, but the generally parallel sidewalls may have a greater height than the generally parallel sidewalls of the receiving portion for the shim sleeve 150 in FIG. 1C. The modified outer surface 159 of the shim sleeve 150' illustrated in FIG. 1D may allow the two-way pivoting body to rest at the same height as the two-way pivoting body for the shim sleeve 150 of FIG. 1C because of the modified outer surface 159 of the shim sleeve 150'. In general, the inner and outer surfaces 158, 159 may be modified to adjust the vertical and/or horizontal position of the two-way pivoting body 140 in relation to the stem 116, the base 114, and/or the upper cover 112 of the housing 110 in a device 10.

The inner and outer surfaces 158, 159 of the shim sleeve 150 may in some embodiments be adjustable. For example, during prototyping or even during use of a pivoting button assembly, various sizes of a shim sleeve may be used and/or the inner and/or outer surfaces of a single shim sleeve may be adjusted. Various inner and/or outer surfaces of a shim sleeve may be used, for example, to adjust the preload on a pivoting button assembly, or to adjust for worn-down tools and molds, or to adjust for a worn stem or shaft receiving portion. In other embodiments, however, the shim sleeve 150 may not be adjustable. For example, a shim sleeve 150 may not be adjustable after it is coupled between a housing and a two-way pivoting body, and an access area for the shim sleeve 150 is sealed.

The shim sleeves 150, 150 illustrated in FIGS. 1C and 1D may in some embodiments be made of a smooth and slippery material, and may in some embodiments even be self-lubricating. For example, the shim sleeves may be made, at least in part, of polytetrafluoroethylene (PTFE), Teflon®, brass, metalized graphite, engineering grade plastic, other materials commonly used for bearings, or other types of metal, plastic, etc., or any combination of the foregoing. In one example embodiment, the shim sleeve 150 is made from an acetal resin, such as DELRIN®. A smooth and slippery material may help reduce the friction between the two-way pivoting body 140 and the shim sleeve 150, as well as help reduce the friction between the stem 116 and the shim sleeve 150. Other embodiments of shim sleeves 150, however, may be made at least in part by non-lubricious materials.

Figure 2A:
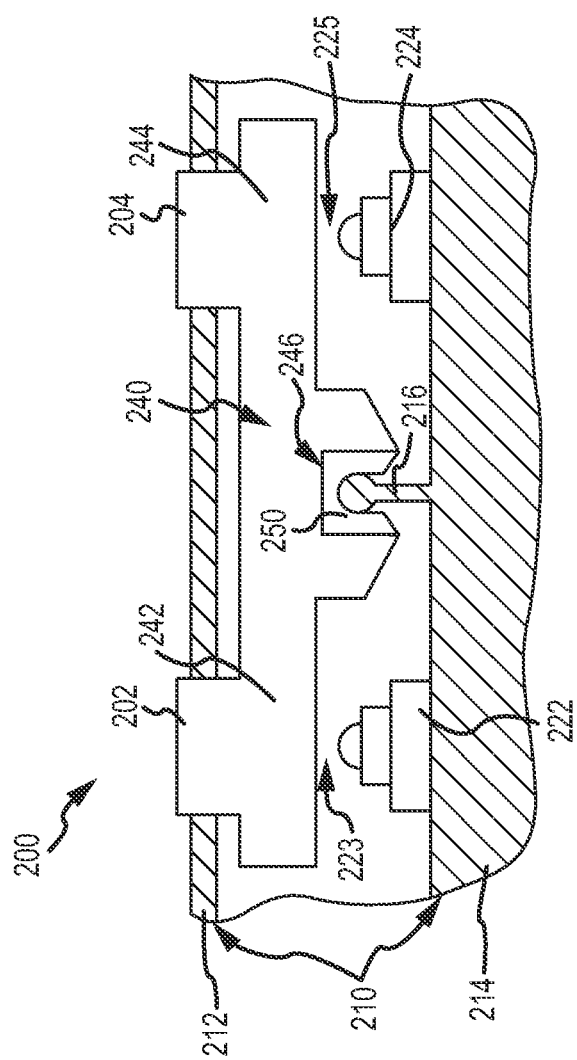
FIG. 2A is a partial cross-sectional view of an embodiment of a pivoting button assembly.

FIGS. 2A through 2D illustrate various additional embodiments of a pivoting button assembly 200 and shim sleeve 250 that may be different from the pivoting button assembly 100 and the shim sleeve 150 in FIGS. 1C and 1D. In FIG. 2A, for example, a partial cross-section of a pivoting button assembly 200 is illustrated with a generally square shaped shaft receiving portion 246. The two-way pivoting body 240 in FIG. 2A also includes slightly tapered walls of the shaft receiving portion 246 in order to, for example, prevent the shaft receiving portion from contacting the base 214 of the housing 210. The shim sleeve 250 illustrated in FIG. 2B (which may in some aspects be similar to the shim sleeves 150, 150' illustrated in FIGS. 1C and 1D) may be used to shim the two-way pivoting body 240 in FIG. 2A. The shim sleeve 250 may include an inner surface 258 similar to the inner surface 158 of the shim sleeve 150 illustrated in FIG. 1C. The outer surface 259 of the shim sleeve 250, however, may be substantially different than the outer surface 159 of the shim sleeve 150 in FIG. 1C in order for the shim sleeve to fill the assembly gap between the square shaped receiving portion 246 and the stem 216. The inner and outer surfaces 258, 259 may be configured such that that shim sleeve 250 is generally an extruded square shape with a center cylinder portion cut-away.

Figure 2B:
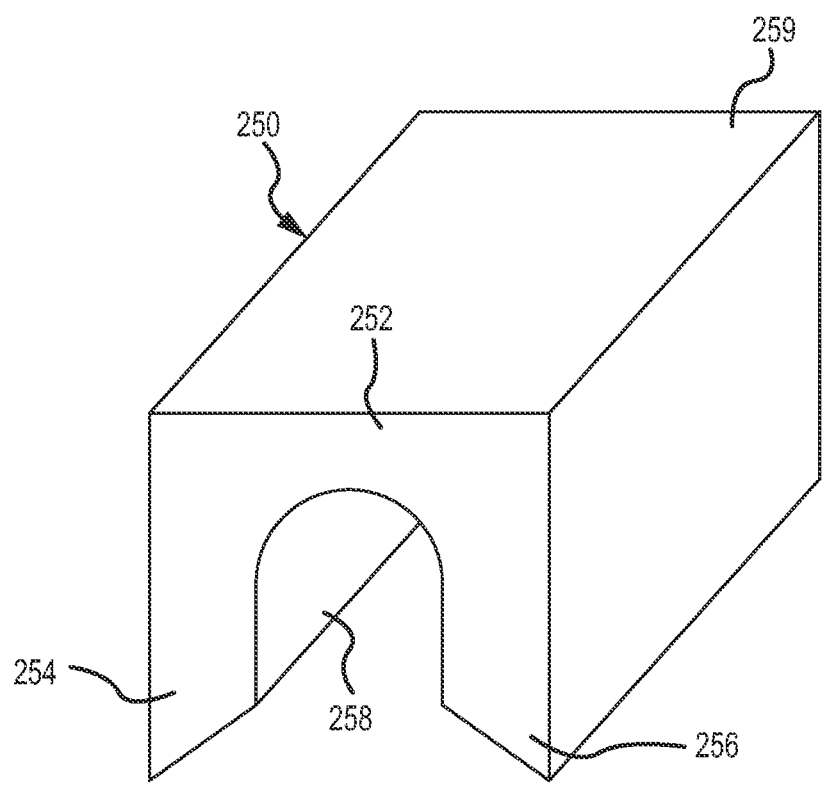
FIG. 2B is a perspective view of an embodiment of a shim sleeve for a pivoting button assembly.

As with the shim sleeves 150, 150' in FIGS. 1C and 1D, the shim sleeve 250 in FIG. 2B may include a top portion 252, a left side portion 254, and a right side portion 256, and these top, left side, and right side portions 252, 254, 256 may be similar in thickness, or may be different thicknesses, as described. In the embodiment of FIG. 2B, the shim sleeve may pivot with the body 240, rather than remaining fixed on the stem.

Figure 2C:
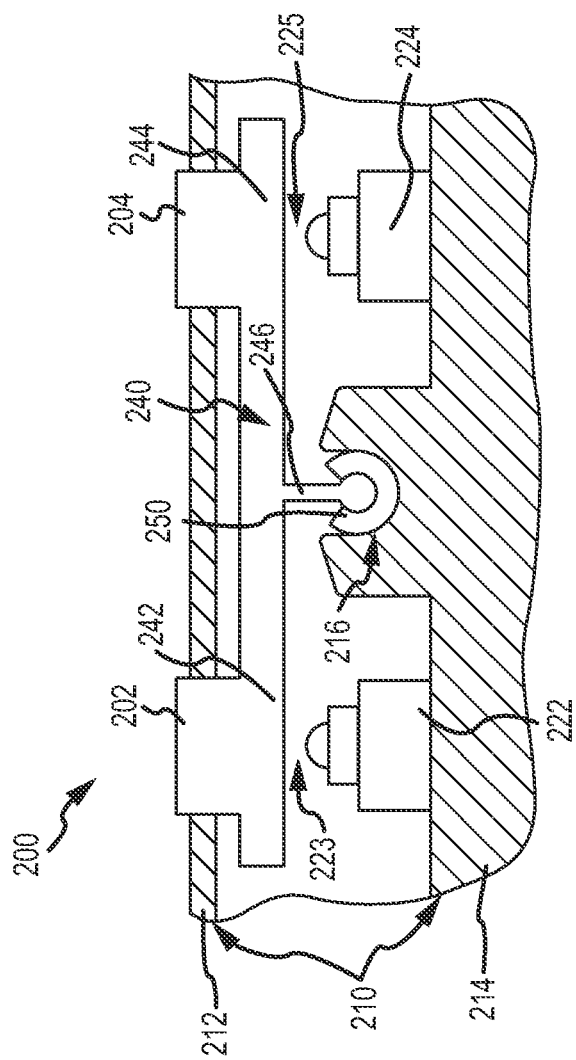
FIG. 2C is a partial cross-sectional view of an embodiment of a pivoting button assembly.

In FIG. 2C, a partial cross-section of a pivoting button assembly 200 is illustrated, similar to the pivoting button assembly 100 in FIG. 1B and the pivoting button assembly 200 in FIG. 2A, except that two-way pivoting body 240 includes a stem 246 and the base 214 includes a shaft receiving portion 216 (as opposed to, in FIG. 1B for example, the two-way pivoting body 140 including the shaft receiving portion 146 and the base 114 including the stem 116). In other words, rather than the pivot point being fixed on the base 114 in FIG. 1B, the pivot point in FIG. 2C is on the two-way pivoting body 240.

Figure 2D:
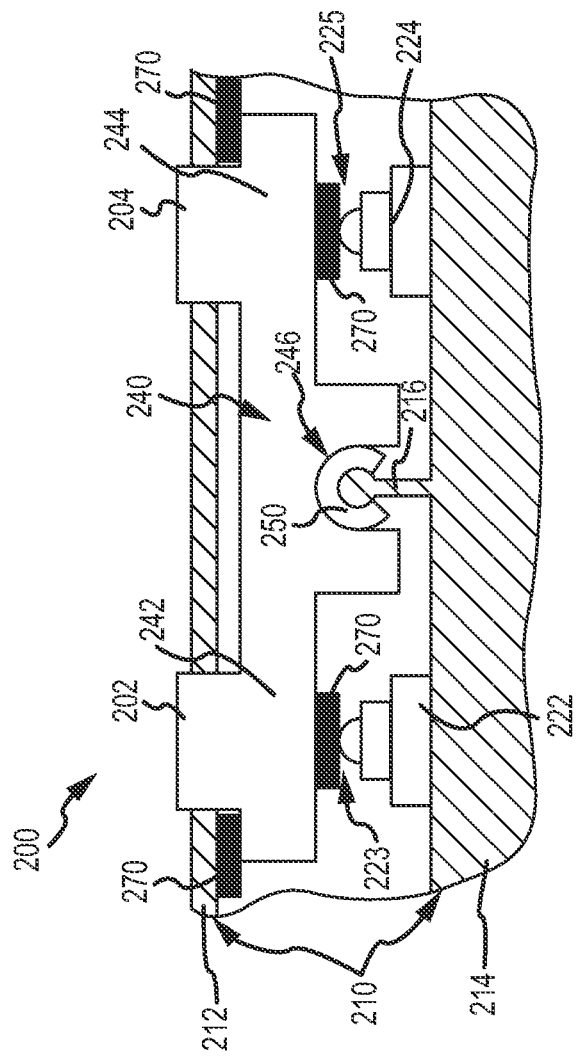
FIG. 2D is a partial cross-sectional view of an embodiment of a pivoting button assembly.

In FIG. 2D, a partial cross-section of a pivoting button assembly 200 is illustrated that includes a plurality of gaskets 270. The gaskets 270 may be compressible, and may be shaped similar to conventional shims for conventional push-type mechanical buttons (e.g., a flat disk shape). The gaskets 270 may at least partially fill the gaps 223, 225, and may provide a smoother movement and release of the two-way pivoting body 240. The gaskets 270 may also help the body 240 to fit better within the housing 210.

In addition to the various embodiments illustrated in FIGS. 1B through 2D, still other embodiments of a pivoting button assembly and/or shim sleeve are possible. For example, a shim sleeve may include additional features or elements not shown in FIGS. 1B through 2D, some of which are described below. As another example, the shim sleeve may include one or more grooves or other alignment mechanisms that may correspond to one or more grooves or other alignment mechanisms on the stem and/or on any part of the housing or other part of the pivoting button assembly. Also, the shim sleeve may be solid or hollow.

Figure 3A:
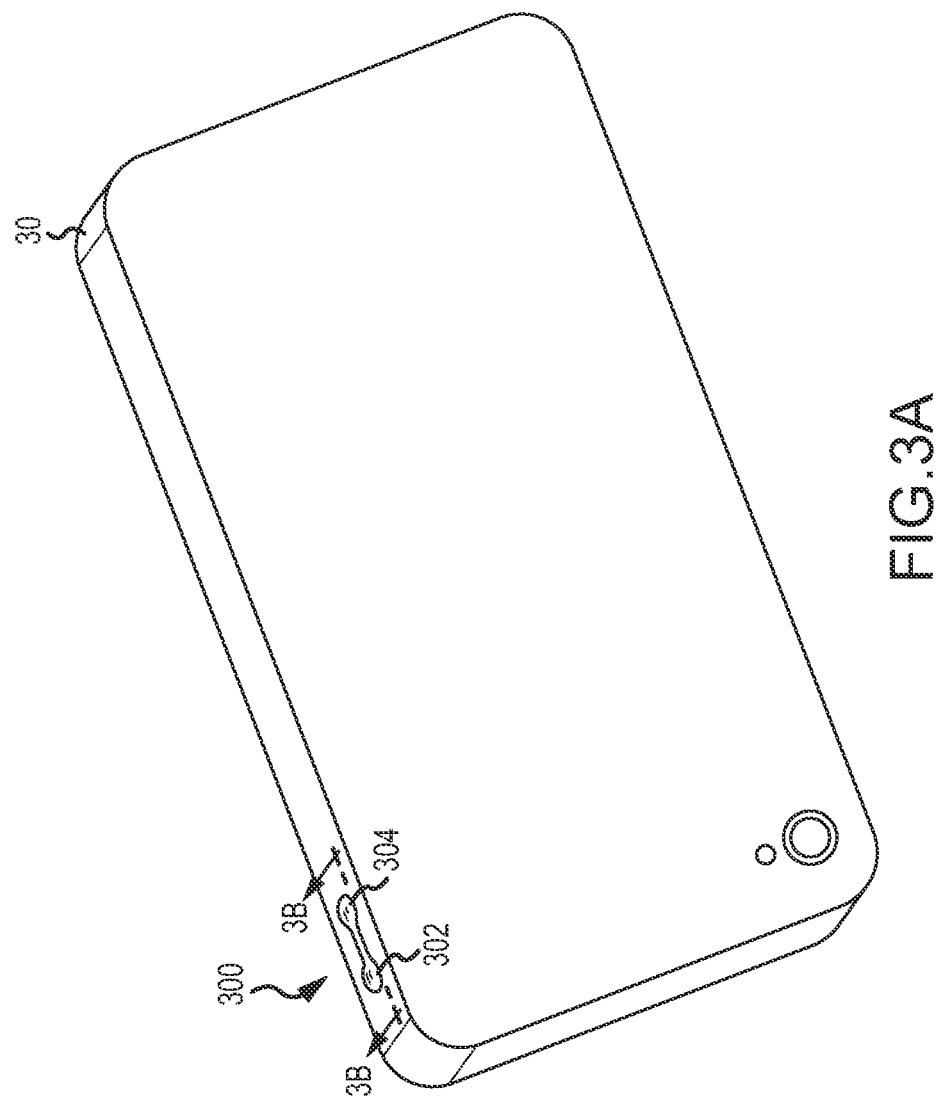
FIG. 3A illustrates a device with an embodiment of a pivoting button assembly.
Figure 3B:
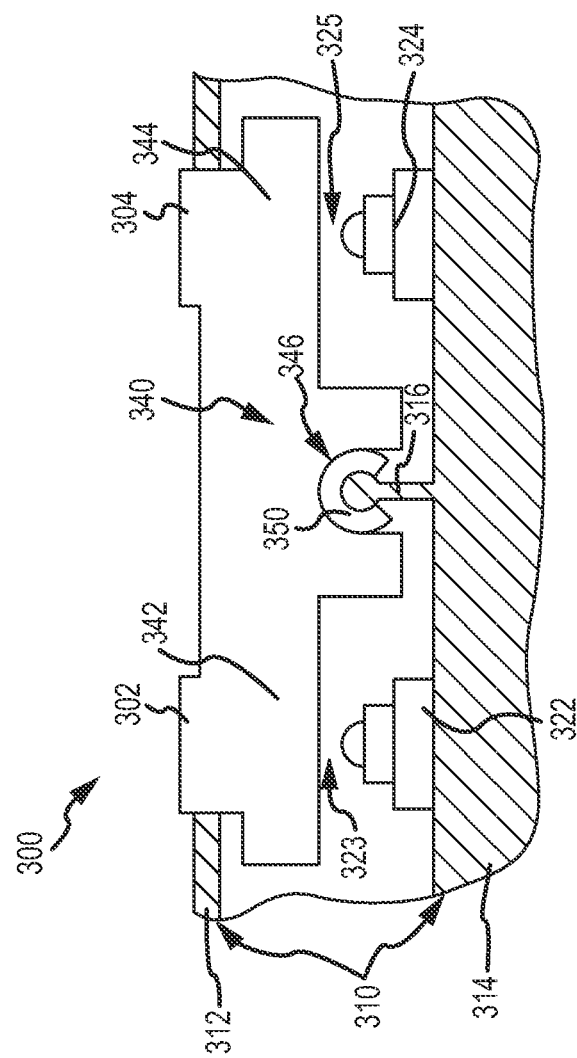
FIG. 3B is a partial cross-sectional view of the pivoting button assembly of FIG. 3A taken along line 3B-3B in FIG. 3A.

FIG. 3A illustrates a device 30 with an embodiment of a pivoting button assembly 300. The pivoting button assembly 300 in FIG. 3A may be similar to the pivoting button assembly 100 in FIG. 1A, except that the buttons 302 and 304 are joined together above the upper cover of the housing in FIG. 3A. The partial cross-section view in FIG. 3B illustrates that the two-way pivoting body 340 couples the two buttons 302, 304, but rather than the coupling link between the two buttons 302, 304 being beneath the upper cover 312 of the housing 310, the coupling link between the two buttons 302, 304 in FIGS. 3A and 3B is made visible to a user above the upper cover 312 of the housing 310. This increased visibility may indicate to a user that the buttons 302, 304 are pivotally coupled to one another.

Figure 4A:
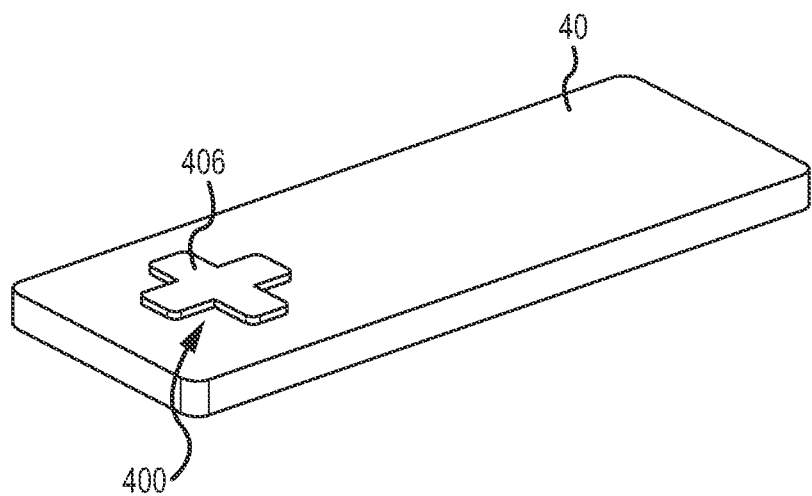
FIG. 4A illustrates a device with an embodiment of a pivoting button assembly.

FIG. 4A illustrates a device 40 with an embodiment of a pivoting button assembly 400. The pivoting button assembly 400 differs from the button assemblies 100, 200, 300 illustrated in FIGS. 1A through 3B in that the pivoting button assembly 400 in FIG. 4A is configured to move in a plurality of axes of movement, as opposed to the single axis of movement allowed in the button assemblies 100, 200, 300 in FIGS. 1A through 3B. The pivoting button assembly 400 in FIG. 4A is configured to move in four directions (up, down, left, and right, for example) via four buttons coupled to a four-way pivoting body, and may be a four-way navigation device to navigate, for example, through menus or through a video game. The device 40 may be a remote control, a game controller, a personal electronic device, or any other device. Also, the four-way pivoting body of the pivoting button assembly 400 may include a first and second portion (similar to the first and second portions 142, 144 of the two-way pivoting body 140 illustrated in FIG. 1B), but may also include a third and fourth portion. The first, second, third, and fourth portions may be configured to actuate one or more sensors, for example four sensors in one embodiment. One or more of the first, second, third, and fourth portions may include an access opening through which the shim sleeve 450 may be installed, as described below in connection with FIG. 6.

Figure 4B:
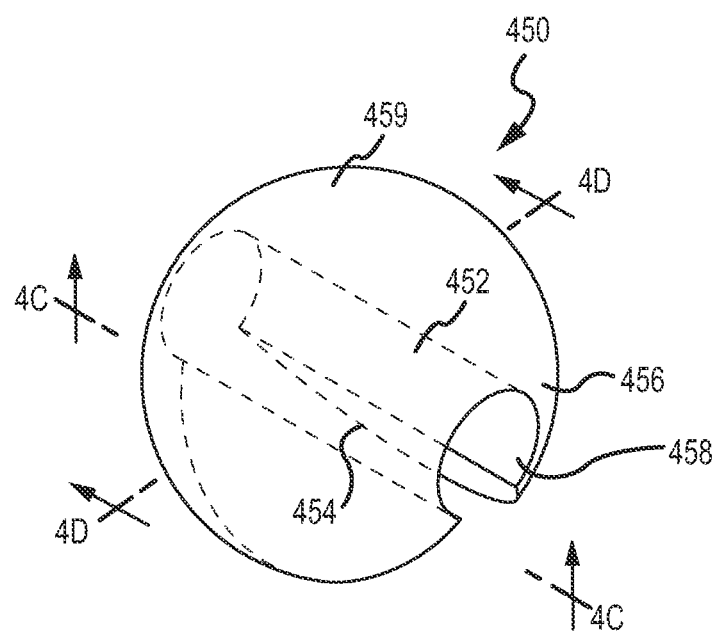
FIG. 4B is a perspective view of an embodiment of a shim sleeve for a pivoting pivot button assembly.
Figure 4C:
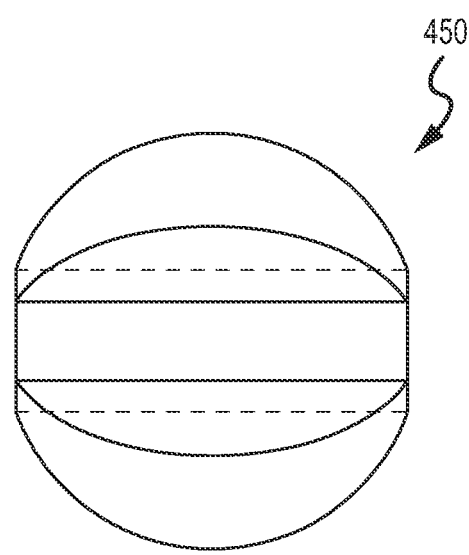
FIG. 4C is a bottom view of the shim sleeve of FIG. 4B viewed along line 4C-4C in FIG. 4B.
Figure 4D:
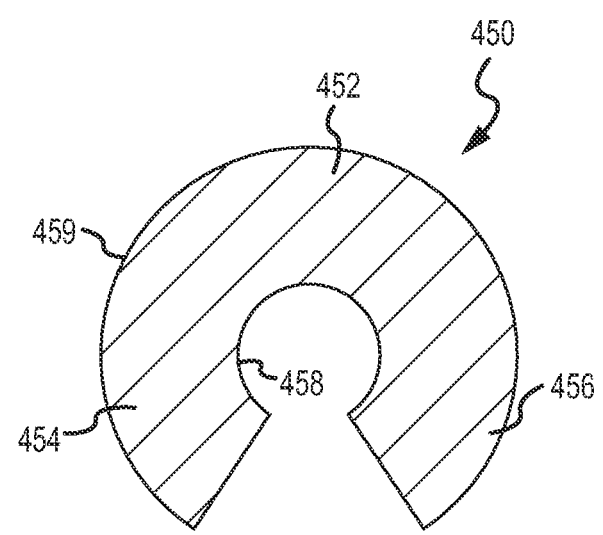
FIG. 4D is a side view of the shim sleeve of FIG. 4B viewed along line 4D-4D in FIG. 4B.

An embodiment of a shim sleeve 450 for use in the pivoting button assembly 400 of FIG. 4A is illustrated in FIGS. 4B through 4D. The shim sleeve 450 may be generally spherically shaped, and may comprise a top portion 452, a left side portion 454, a right side portion 456, an inner surface 458, and an outer surface 459. As with the shim sleeve 150, 150' in FIGS. 1C and 1D as described above, the top portion 452, the left side portion 454, and the right side portion 456 may be similar in thickness, or may be eccentric and have different thicknesses. The inner surface 458 of the shim sleeve 450 may be configured to engage a stem similar to the stem 116 illustrated in FIG. 1B. The outer surface 459, however, may be configured to engage a receiving portion of a four-way pivoting body.

Figure 5:
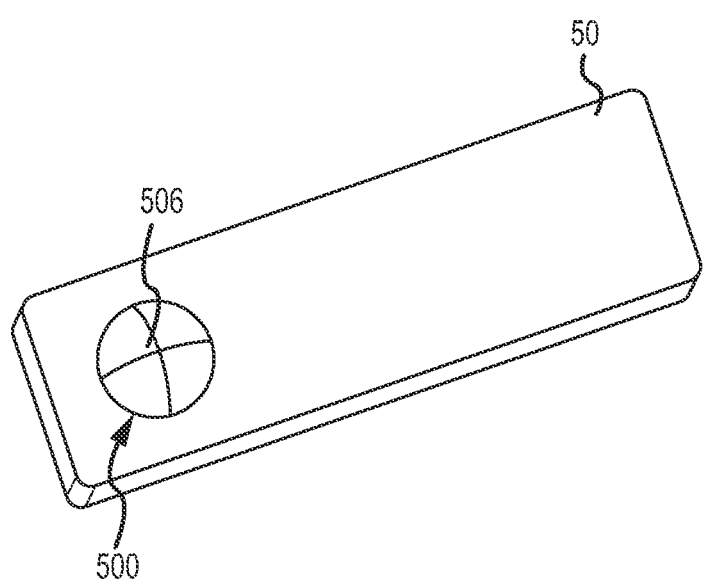
FIG. 5 illustrates a device with an embodiment of a pivoting button assembly.

FIG. 5 illustrates a device 50 with an embodiment of a pivoting button assembly 500. The pivoting button assembly 500 may be similar to the pivoting button assembly 400 in FIG. 4A, except that the pivoting button assembly 500 may be a continuous navigation pad (e.g., not limited to only four directions). The pivoting button assembly 500 may, similar to the pivoting button assembly 400, include a multi-axis pivoting body and a shim sleeve. The shim sleeve in the pivoting button assembly 500 may be similar to the shim sleeve 450 illustrated in FIG. 4B in some embodiments. The sensor(s) in the pivoting button assembly 500, however, may be different in that there may be four or even more sensors. For example, in some embodiments, the pivoting button assembly 500 may include eight sensors. In other embodiments, the pivoting button assembly 500 may include a single cylindrical-shaped sensor with multi-sensing capabilities.

Figure 6:
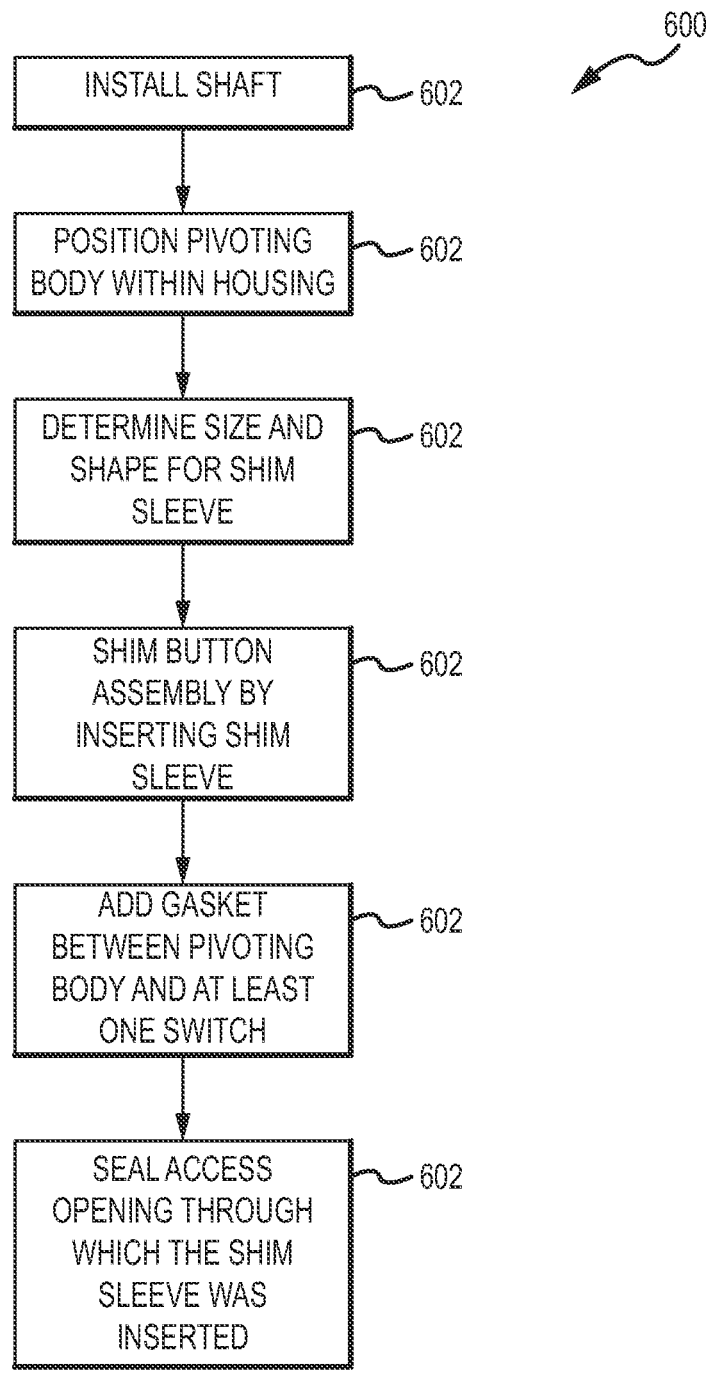
FIG. 6 is a flow chart illustrating a method of manufacturing a pivoting button assembly using a shim sleeve.

FIG. 6 illustrates a flow chart illustrating a method 600 for manufacturing a pivoting button assembly, such as the pivoting button assembly 100 in FIG. 1A and or the button assemblies 200, 300, 400, 500 in FIGS. 2A through 5. In a first step 602, a shaft may be installed. In a second step 604, a pivoting body may be positioned within the housing, with the pivoting body being coupled to the housing through the shaft and a shaft receiving portion, the shaft receiving portion defining an arcuate structure configured to receive at least a portion of the shaft. For example, for the pivoting button assembly 100 in FIG. 1B, the pivoting body may include the two-way pivoting body 140 and the two buttons 102, 104. The two-way pivoting body 140 may include the shaft receiving portion 146, which may be coupled to the shaft 116 in FIG. 1B.

After the pivoting body is positioned within the housing, in a third step 606, the size and shape for a shim sleeve may be determined, as described in detail above. In a fourth step 608, the shaft may be shimmed with the sleeve positioned between the shaft and the arcuate structure, and the sleeve configured to reduce the gap between the shaft and the shaft receiving portion. For the pivoting button assembly illustrated in FIG. 1B, if the two-way pivoting body has at least one access opening, the shim sleeve 150 may be slid over the stem 116 from the side after the two-way pivoting body 140 (and its buttons 102, 104) are already positioned within the housing 110. This arrangement may allow the sleeve to be added relatively late in the manufacturing process of a device, and may also allow the sleeve to be removed and/or replaced without removing the two-way pivoting body 140 from the housing 110. As mentioned above, the shim sleeve 450 of the pivoting button assembly 400 may similarly be inserted into the pivoting button assembly 400 in accordance with the method of manufacture described in FIG. 6. Also, the shim sleeves 250, 350 in FIGS. 2A through 3B may similarly be inserted into the respective button assemblies 200, 300 in accordance with the method of manufacture described in FIG. 6.

In a fifth step 610, a gasket may be added between the pivoting body and at least one switch. In a sixth step 612, the access opening through which the shim sleeve was inserted may be sealed. Other steps in addition to or in place of the foregoing steps may also be used in during the manufacturing of the pivoting button assembly.

Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof. For example, the pivot button assemblies described may be incorporated into keyboards, trackpads, portable mobile devices like tablets and phones and so on.

The invention claimed is:

1. A button assembly, comprising:
   a stem;
   a button body having a receiving portion pivotally coupled to the stem, wherein the stem is positioned within an aperture of the receiving portion, the aperture providing a gap between the receiving portion and the stem, wherein the button body is configured to pivot about the stem; and
   a shim sleeve having a non-uniform thickness coupled over the stem and positioned between the receiving portion and the stem, the shim sleeve configured to reduce the gap between the receiving portion and the stem.

2. The button assembly of claim 1, wherein the shim sleeve is generally shaped like a cylinder with a portion of a sidewall of the cylinder cut-away.

3. The button assembly of claim 1, wherein the shim sleeve comprises a smooth and slippery material.

4. The button assembly of claim 1, wherein the shim sleeve comprises metal.

5. The button assembly of claim 1, wherein the shim sleeve comprises a top portion and a side portion, the top portion being thicker than the side portion.

6. The button assembly of claim 1, wherein the shim sleeve comprises a top portion and a side portion, the side portion being thicker than the top portion.

7. The button assembly of claim 1, wherein the stem extends perpendicularly from a base and the button assembly further comprising a plurality of switch elements located on the base adjacent to the stem.

8. The button assembly of claim 7, wherein the receiving portion is coupled to a plurality of buttons, the plurality of buttons associated with the plurality of switch elements.

9. The button assembly of claim 7, further comprising a gasket shimming a gap between the receiving portion and one of the plurality of switch elements.

10. The button assembly of claim 1, further comprising:
    a pivoting body;
    a base; and
    a plurality of sensors on the base adjacent to the receiving portion, wherein the base comprises the receiving portion and the stem extends from a pivoting body.

11. The button assembly of claim 1, wherein the receiving portion comprises two substantially parallel sidewalls and an arcuate upper portion.

12. An apparatus, comprising:
    a base;
    a button having a shaft receiving portion and movably coupled to the base through a shaft and the shaft receiving portion, the shaft receiving portion defining an arcuate structure configured to receive at least a portion of the shaft, wherein the button is configured to pivot about the shaft; and
    a shim coupled between the shaft and the shaft receiving portion, the shim having a first surface configured to engage the portion of the shaft and a second surface configured to engage at least a portion of the arcuate structure of the shaft receiving portion.

13. The apparatus of claim 12, wherein the shim pivots with the shaft receiving portion about the shaft.

14. The apparatus of claim 12, wherein the shim is generally spherically shaped and the button is configured to move in a plurality of axes.

15. The apparatus of claim 14, wherein the shim comprises a recess configured to allow the shim to be coupled between the shaft and the shaft receiving portion.

16. The apparatus of claim 12, wherein the base comprises the shaft and the button comprises the shaft receiving portion.

17. The apparatus of claim 12, further comprising:
    a sensor coupled to the button, the sensor configured to provide a signal indicative of movement of the button.

18. The apparatus of claim 12, wherein the arcuate structure comprises two substantially parallel sidewalls and an arcuate upper portion.

* * * * *